(12) United States Patent
Hong

(10) Patent No.: US 6,529,929 B2
(45) Date of Patent: Mar. 4, 2003

(54) QUANTIZATION DEVICE AND METHOD USING PRIME NUMBER DIVIDERS

(75) Inventor: John Suk-Hyun Hong, San Jose, CA (US)

(73) Assignee: Teleman Multimedia, Inc., Alviso, CA (US)

( * ) Notice: Subject to any disclaimer, the term of this patent is extended or adjusted under 35 U.S.C. 154(b) by 47 days.

(21) Appl. No.: 09/816,857

(22) Filed: Mar. 22, 2001

(65) Prior Publication Data

US 2002/0161811 A1 Oct. 31, 2002

(51) Int. Cl.[7] .............................. G06F 7/38; G06F 7/52
(52) U.S. Cl. ...................................... 708/550; 708/650
(58) Field of Search .............................. 708/550–551, 708/496–497, 650–656

(56) References Cited

U.S. PATENT DOCUMENTS

| | | | | |
|---|---|---|---|---|
| 4,334,285 A | * | 6/1982 | Kawakita et al. | 708/650 |
| 4,755,961 A | * | 7/1988 | Kuriki et al. | 708/551 |
| 5,140,544 A | * | 8/1992 | Lin et al. | 708/650 |
| 5,208,770 A | * | 5/1993 | Ito | 708/551 |
| 5,329,475 A | * | 7/1994 | Juri et al. | 708/551 |

\* cited by examiner

*Primary Examiner*—Tan V. Mai
(74) *Attorney, Agent, or Firm*—David T. Millers

(57) ABSTRACT

A quantization circuit includes a set of prime number dividers that can be implemented as look-up tables and a shifter. A shifter implements divisions by prime number (two) and by powers of two. Multiplexing circuitry interconnects the prime number dividers to permit performance of a series of prime number divisions in a single clock cycle. The quantization circuit can thus implement one-cycle divisions by divisors that are products of the prime numbers and powers of two in the series that the multiplexing circuitry selects. For divisors that are longer series of the prime numbers implemented in the quantization circuit, the quantization circuit can implement multi-cycle divisions by feeding an output signal back through further series of the prime number dividers. For a target divisor that normally would require division by a prime number not implemented in the quantization circuit, the quantization circuit can perform multiple divisions by an implemented divisor that is close to the target divisor with each division acting on the result from the previous division. An accumulation of the results of the multiple cycles provides a final quotient appropriate for the target divisor.

20 Claims, 2 Drawing Sheets

QUANTIZATION DEVICE AND METHOD USING PRIME NUMBER DIVIDERS

BACKGROUND

Many digital encoding processes and particularly video encoding processes such as MPEG1, MPEG2, and MPEG4, and H.263 require quantization of data points. Quantization is a process that converts a data point that is within a relatively large dynamic range to an approximately equivalent value within a smaller dynamic range. For example, quantization can convert a 16-bit data value to an 8-bit value, which requires less bandwidth to transmit and less memory capacity to store.

Generally, quantization converts a data point P that has one of N possible values to a quantized value Q having one of M possible values, where M is less than N. Equation 1 describes the general quantization process.

Equation 1: $Q=INT(P*M/N)$

In Equation 1, the function INT converts (P*M/N) to an integer value by rounding, truncation, or whatever other method the quantization process may require. The quantized value Q can generally be represented using fewer bits than are required for data point P but typically provides less accuracy.

Hardware encoders or decoders implementing quantization processes generally require hardware dividers. However, full functions dividers are complex circuits that require a significant amount of area in an integrated circuit. Full function dividers thus increase the complexity and cost of hardware.

A hardware encoder can alternatively employ a look-up table to perform divisions by a selected value. Such encoders lack flexibility and cannot accommodate quantization processes that some encoding or decoding processes may require, for example, if an encoding process requires quantization that divides a range by a value not provided for by a look-up table.

A quantization method and circuit is thus sought that has the flexibility to accommodate a wide variety of different quantization process but does not require the complexity or area of a full divider.

SUMMARY

In accordance with an aspect of the invention, a quantization circuit includes a set of prime number dividers that can be implemented as look-up tables and a shifter. A shifter implements divisions by prime number (two) and by powers of two. Multiplexing circuitry interconnects some or all of the prime number dividers to permit performance of a series of prime number divisions in a single clock cycle. The quantization circuit can thus implement one-cycle divisions by divisors that are products of powers of two and the prime numbers in the series that the multiplexing circuitry selects. For divisors corresponding to a longer series of the prime numbers than can be implemented in the quantization circuit, the quantization circuit can implement multi-cycle divisions by feeding an output signal back through one or more further series of the prime number dividers.

For a target divisor that normally would require division by a prime number not implemented in the quantization circuit, the quantization circuit can perform multiple divisions by an implemented divisor that is close to the target divisor with each division acting on the result from the previous division. An accumulation of the results of the multiple cycles provides a final quotient appropriate for the target divisor.

One specific embodiment of the invention is a quantization circuit that includes a plurality of dividers, a first multiplexing circuit, and a second multiplexing circuit. The dividers include a first divider, a second divider, and a third divider, typically look-up table dividers, with each divider corresponding to a prime number divisor and generating from an input signal representing a dividend an output signal representing the quotient of the dividend and the corresponding prime number divisor.

The first multiplexing circuit is connected to input ports of the dividers and operates to select an input signal for the second divider from a set of signals including a first signal representing the dividend and the output signal from the first divider. The multiplexing circuit also selects an input signal for the third divider from a set of signals including the first signal, and the output signal from the first divider, and an output signal from the second divider.

The second multiplexing circuit has input ports connected to the output ports of the first, second, and third dividers and operates to select a second signal for output from a set of signals including the output signals of the first, second, and third dividers.

The prime number dividers can further include fourth and fifth prime number dividers with the first, second, third, fourth and fifth dividers corresponding to prime numbers 3, 5, 7, 11, and 13. A shifter can be coupled to an output port of the second multiplexing circuit for further dividing by powers of two during the same clock cycle as the other dividers. The quantization circuit can further include an arithmetic logic unit connected to combine results based on two or more operations of the dividers or a register file having a read port coupled to an input port of the first multiplexing circuit and a write port coupled to an output port of the second multiplexing circuit.

One method for operating the quantization circuit to divide a dividend by a divisor includes: controlling the first multiplexing circuit so that except for a last divider in a series, each divider in the series provide the signal input to a following divider in the series. Further, the division method can feed back an output signal of the quantization circuit as an input signal to the quantization circuit; and again control the first multiplexing circuit so that except for a last divider in a further series, each divider in the further series provides input to a following divider in the series. Optionally, the method further includes combining (e.g., adding or subtracting) a first result represented by the output signal fed back to the quantization circuit and a second result that the quantization circuit provides when the first multiplexing circuit is controlled for the further series.

Another embodiment of the invention is a quantization circuit including a plurality of dividers, a first multiplexing circuit, a second multiplexing circuit, and a storage circuit. The dividers correspond to prime number divisors, and each divider generates from an input signal representing a dividend an output signal representing the quotient of the dividend and the corresponding prime number divisor. The first multiplexing circuit connects to input ports of the dividers and operates to select input signals for the dividers. The second multiplexing circuit has input ports connected to the output ports of the dividers and operates to select an output signal from a set of signals including the output signals of the dividers. The storage circuit is connected to receive the output signal of the second multiplexing circuit during a first clock cycle and provide a signal to the first multiplexing circuit for processing during a second clock cycle. Accordingly, during the second clock cycle the dividers can divide a result from the first clock cycle.

The storage circuit can include a latch or a register file, and a shifter can be coupled between the second multiplexing circuit and the storage circuit. An arithmetic logic unit coupled to the storage circuit can combine results based on operations of the dividers during the first and second clock cycle.

Aspects of the invention will be further understood in view of the drawings and the detailed description provided below.

BRIEF DESCRIPTION OF THE DRAWINGS

Use of the same reference symbols in different figures indicates similar or identical items.

DETAILED DESCRIPTION

In accordance with an aspect of the invention, a quantization process includes a series of one or more division by prime numbers such as 2, 3, 5, 7, 11, and 13. The processes can employ simple divider circuits such as look-up tables or shift registers that implement the prime number divisions, and interconnections of the divider circuits permit multiple divisions for divisions by products of the prime numbers. The simple divider circuits have low latency, which permits serial operation of two or more of the divider circuits within one clock cycle. Accordingly, a few prime number dividers provide divisions by a wide range of divisors in a single clock cycle. Division by a still wider range of divisors can be achieved in two or more cycles by repeated use of the process.

Figure 1:
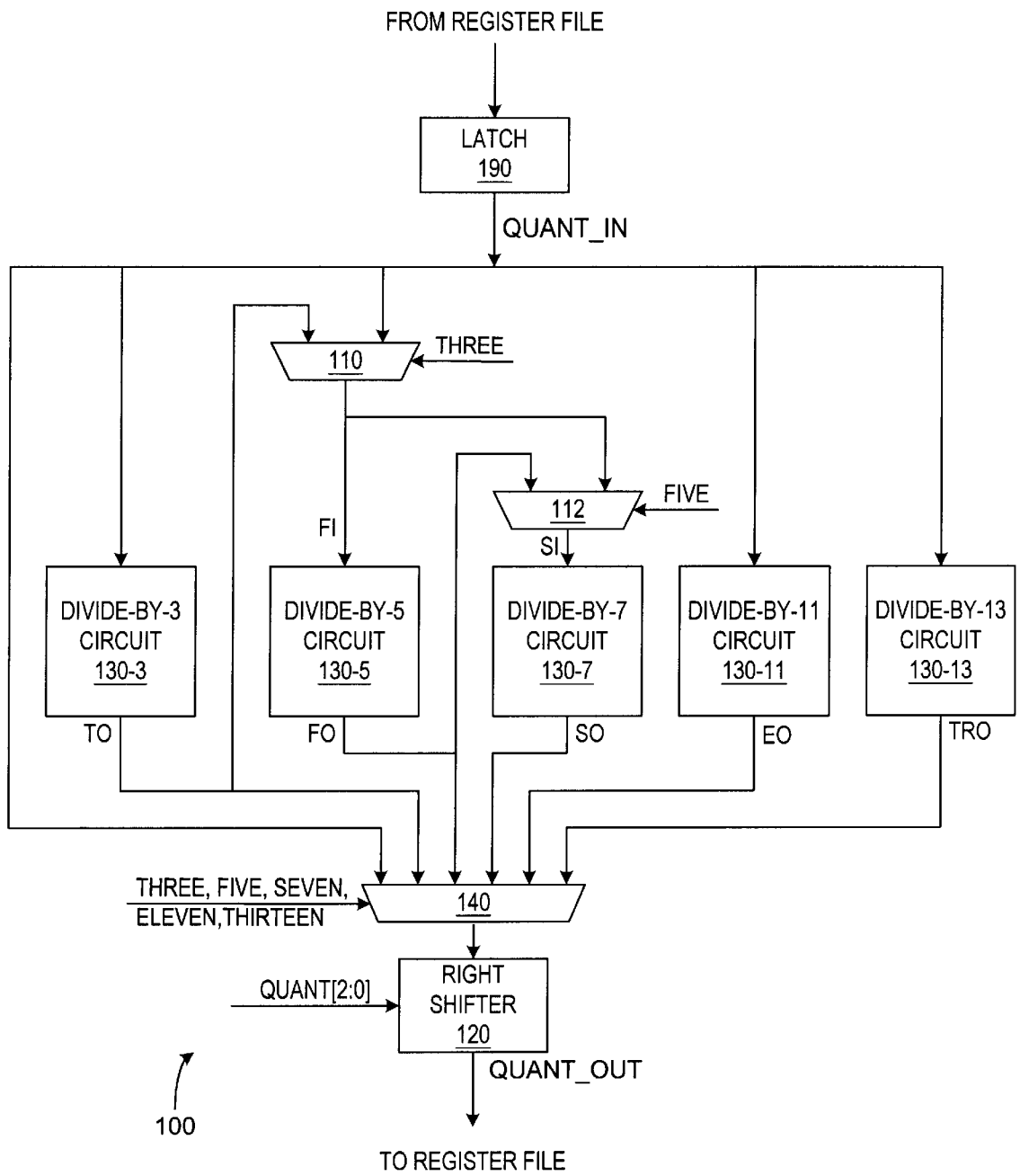
FIG. 1 is a block diagram of a quantization circuit in accordance with an embodiment of the invention.

FIG. 1 shows a block diagram of a quantization circuit 100 according to an exemplary embodiment of the invention. Quantization circuit 100 includes a right shifter 120, a set of prime number dividers 130, and multiplexers 110, 112, and 140 that connect circuits 120 and 130. Prime number dividers 130 include a divide-by-three circuit 130-3, a divide-by-five circuit 130-5, a divide-by-seven circuit 130-7, a divide-by-eleven circuit 130-11, and a divide-by-thirteen circuit 130-13.

Right shifter 120 is effectively a divider circuit that divides an input value by $2^N$, where an input signal QUANT [2:0] indicates the exponent N. The effect of right shifter 120 is the same as a series of N divisions by the prime number 2.

Each prime number divider 130 is a basic look-up table divider in the exemplary embodiment of the invention. A look-up table divider generally corresponds to a particular divisor and receives an input signal representing a dividend. The input signal acts as an index that select an output value or signal from the look-up table, and that output signal represents the quotient resulting from dividing the dividend by the divisor. Instead of a look-up table divider, other types of divider circuits could implement such prime number divisions, but look-up table dividers are generally smaller that other dividers when the table is limited, i.e., when the input signal can only represent a dividend within a limited range.

In the exemplary embodiment, divide-by-three circuit 130-3, divide-by-eleven circuit 130-11, and divide-by-thirteen circuit 130-13 always receive an input signal QUANT_IN, which typically represents the dividend being quantized. Divide-by-three circuit 130-3, divide-by-eleven circuit 130-11, and divide-by-thirteen circuit 130-13 respectively output signals TO, EO, and TRO representing value QUANT_IN divided by three, eleven, and thirteen, respectively.

Multiplexers 110 and 112 select the input signals for each of prime number dividers 130-5, and 130-7. Multiplexer 110 selects either signal TO from divide-by-three circuit 130-3 or signal QUANT_IN as the signal FI input to divide-by-five circuit 130-5. A control signal THREE for multiplexer 110 is asserted if the quantization operation being performed involves a divide-by-three operation. The output signal FO from divide-by-five circuit 130-5 represents either the value of signal QUANT_IN divided by five or fifteen depending on whether multiplexer 110 selected signal TO or QUANT_IN as the input signal FI.

Multiplexer 112 selects either the output signal FO from divide-by-five circuit 130-5 or signal FI from multiplexer 110 as the input signal SI to divide-by-seven circuit 130-7. A control signal FIVE for multiplexer 112 is asserted to select signal FO for input to divide-by-seven circuit 130-7 if the quantization operation being performed involves a divide-by-five operation. The output signal SO from divide-by-seven circuit 130-7 represents either QUANT_IN divided by seven, twenty one, thirty five, or one hundred and five depending on whether multiplexer 110 selected signal TO or QUANT_IN and whether multiplexer 112 selected signal FI or FO.

Multiplexing circuits (e.g., multiplexers 110 and 112) that select the input signals for the prime number dividers 130 can be varied significantly without departing from the present invention. For example, instead of requiring that signal TO from divide-by-three circuit 130-3 propagate through two multiplexers 110 and 112 when required for input to divide-by-seven circuit 130-7, a multiplexer having three input ports that directly receive signals QUANT_IN, TO, and FO could select the input signal for divide-by-seven circuit 130-7. Additionally, signal SI from multiplexer 112 can be input to divide-by-eleven circuit 130-11 and divide-by-thirteen circuit 130-13 instead of signal QUANT_IN.

In other variations of the multiplexing circuitry, any of the prime number dividers 130 can have signal QUANT_IN as its only possible input signal (as does prime number divider 130-3), have an input signal selected from a set of signals include signal QUANT_IN and output signals of all other prime number dividers (as does right shifter 120), or an input signal selected from a set including signal QUANT_IN and a subset of the output signals from the other prime number dividers (as do prime numbers dividers 130-5 and 130-7). Generally, if the multiplexing circuit can select the output signal of a first prime number divider as the input signal of a second prime number divider, the multiplexing circuit does not need provide the output signal of the second prime number divider as the input signal of the first prime number.

Multiplexer 140 selects one of the six signals QUANT_IN, TO, FO, SO, EO, or TRO as an input signal to right shifter 120 based on which of control signals THREE, FIVE, SEVEN, ELEVEN, and THIRTEEN are asserted. If the quantization operation requires a division by seven, eleven, or thirteen, control signal SEVEN, ELEVEN, or THIRTEEN is asserted, and multiplexer 140 selects signal SO, EO, or TRO from divide-by-seven circuit 130-7, divide-byeleven circuit 130-11, or divide-by-thirteen circuit 130-13. Multiplexer 140 selects signal FO from divide-by-five circuit 130-5 if the operation requires division by five and does not require division by any of the larger prime numbers seven, eleven, and thirteen. Multiplexer 140 selects signal TO from divide-by-three circuit 130-3 if the operation requires division by three and does not require division by any of the larger prime numbers five, seven, eleven, and thirteen. If the quantization operation does not involve division by three, five, seven, eleven, or thirteen, none of control signals THREE, FIVE, SEVEN, ELEVEN, or THIRTEEN are asserted, and multiplexer 140 selects signal QUANT_IN as the input signal for right shifter 120.

Right shifter 120 receives the output signal from multiplexer 140 and performs a shift operation by 0 to 5 bits depending on the value of signal QUANT[2:0]. Right shifter 120 thus can divide the output value by 1, 2, 4, 8, 16, or 32.

In a quantization operation, the control signals THREE, FIVE, SEVEN, ELEVEN, THIRTEEN and QUANT[2:0] are set according to the desired divisor and the input signal QUAN_IN is applied to represent the value being quantized. A look-up table that receives the divisor as an index can output the appropriate control signals for the quantization operation.

In the exemplary embodiment, signals can propagate through two of the prime number dividers 130 and then through right shifter 120 within a single clock cycle. The multiplexing circuit (e.g., multiplexers 110 and 112) that selects input signals for prime number dividers 130 can only provide combination division involving 3, 5, and 7. As a result, in a single cycle, quantization circuit 100 can perform a division where a 6-bit divisor is selected from the set including: 2, 3, 4, 5, 6, 7, 8, 10, 11, 12, 13, 14, 15, 16, 20, 21, 22, 24, 26, 28, 30, 32, 35, 40, 42, 44, 48, 52, 56, and 60.

Other 6-bit divisors can be achieved in two or more clock cycles by circulating the output signal QUANT_OUT through a register file or latch back into quantization circuit 100 as input signal QUANT_IN. The 6-bit divisors that can be implemented in two clock cycles include 9, 18, 25, 33, 36, 39, 45, 49, 50, 55, and 63. Divisors 27 and 54 require three clock cycle quantization operations.

During quantization operations requiring multiple clock cycles, the control signals on multiplexers 110, 112, and 140 change or not for each pass through quantization circuit 100. Dividing by 9, for example, requires two clock cycles. For the first clock cycle, signal QUANT_IN represents the value being quantized (i.e., divided by nine), and during the second clock cycle, signal QUANT_IN is output signal QUANT_OUT was output at the end of the first clock cycle. During both clock cycles, control signal THREE is active, control signals FIVE, SEVEN, ELEVEN, and THIRTEEN are inactive, and signal QUANT[2:0] causes no shifting. For a divisor equal to 45, control signals THREE and FIVE are activated in one (first or second) clock cycle, but only control signal THREE is activated during the other (second or first) clock cycle.

In one embodiment of the invention, quantization circuit 100 is a portion of a processor, and instructions to quantization circuit 100 are limited to single cycle instructions, and an instruction performs division by 2, 3, 4, 5, 6, 7, 8, 10, 11, 12, 13, 14, 15, 16, 20, 21, 22, 24, 26, 28, 30, 32, 35, 40, 42, 44, 48, 52, 56, and 60. When programming such the processor, a compiler or assemble converts an instruction with 9, 18, 25, 36, 45, 49, and 50 as divisor in to two consecutive single cycle instructions. The compiler converts instructions with divisors 27 and 54 in to a series of three single cycle instructions for quantization circuit 100. Alternatively, processor hardware such as described below can control multi-cycle operations.

As noted above, quantization circuit 100 can implement divisions for most 6-bit integer divisors in three or fewer clock cycles, with the vast majority of divisions implemented in a single clock cycle. Quantization circuit 100 is, however, unable to provide exact divisions for some divisors such as 17, 19, 23, 29, 31, 34, 37, 41, 43, 46, 47, 51, 53, 57, 58, 59, and 61. These divisors are not common in quantization operations in conventional encoding or decoding protocols, but quantization circuit 100 can provide approximate results for these divisors by performing divisions by an implemented divisor. Dividing by 18 instead of 17, which is the worst case, provides less than a 0.4% error. For other unimplemented 6-bit divisors, the error resulting from using the nearest implemented divisor is less than 0.4%.

The approximation of a division by a divisor not implemented in quantization circuit 100 can be further improved using second or higher order approximation based on an expansion such as given in Equation 2 or 3. In Equations 2 and 3, P is a data point being quantized, and X is a divisor that quantization circuit 100 implements. If quantization circuit 100 does not implement division by X+1 or X−1, adding or subtracting the results of a series of two or more division operations as indicated in Equation 1 or 2 increases the accuracy of a division result when compared to a single division operation.

$$\text{Equation 2: } \frac{P}{(X+1)} = \frac{P}{X} - \frac{P}{X^2} + \frac{P}{X^3} - \dots$$

$$\text{Equation 3: } \frac{P}{(X-1)} = \frac{P}{X} + \frac{P}{X^2} + \frac{P}{X^3} - \dots$$

An example of a second order approximation of division by 17 can achieve a result with an error less than 0.02% in a process taking three clock cycles. The second order approximation takes the difference of two sequential divide-by-16 operations. More specifically, control circuitry (not shown) deactivates signals THREE, FIVE, SEVEN, ELEVEN, and THIRTEEN and sets signal QUANT[2:0] so that right shifter 120 divides an input value P represented by input signal QUANT_IN by sixteen during a first clock cycle. The result value (P/16) of signal QUANT_OUT after the first divide-by-sixteen operation is stored in a register and fed back from a latch 190 to quantization circuit 100 as input signal QUANT_IN during a second clock cycle. The control signals are the same during the second clock cycle, and quantization circuit 100 performs a second divide-by-16 operation. The result at the end of the second clock cycle is the original value P divided by 256 (or $16^2$). An arithmetic unit (not shown) subtracts the result of the second clock cycle from the stored result from the first clock cycle to obtain a second order approximation of Equation 2 for X equal to 16 and X+1 equal to 17.

Adding one or more prime number divider (e.g., a divide-by-seventeen circuit) to quantization circuit 100 can implement additional divisors (e.g., 17 and 34) in a single clock cycle. However, addition of dividers for larger prime numbers such as 17, 19, 23, etc. do not provide as much benefit as dividers for the smaller prime numbers 2, 3, 5, 7, 11, and 13 because the larger prime numbers are required for a smaller percentage of the possible divisors. Accordingly, addition of further prime number dividers to quantization circuit 100 may be undesirable.

Figure 2:
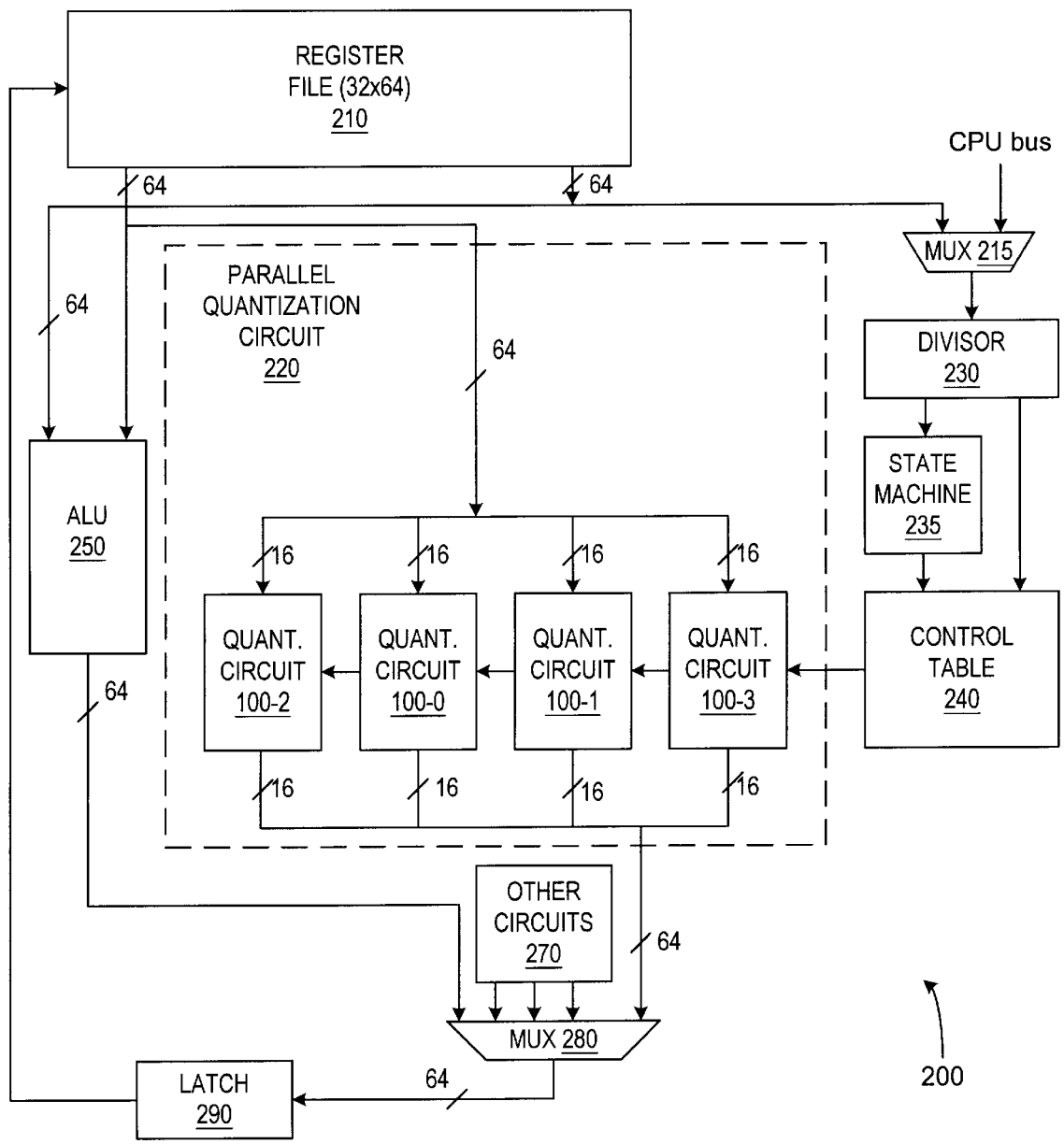
FIG. 2 is a block diagram of a processor including quantization circuits in accordance with another embodiment of the invention.

One application of quantization circuit 100 is in a video processor. The small size of quantization circuit 100 facilitates parallel processing using multiple copies of quantization circuit 100. FIG. 2 is a block diagram of an exemplary embodiment of a video processor 200 with a parallel quantization circuit 220 that including four quantization circuits 100-0 to 100-3, which have the same construction as shown in FIG. 1. Accordingly, parallel quantization circuit 220 can perform four divisions in parallel.

In one embodiment of the invention, video processor 200 is a coprocessor in a system or integrated circuit that includes a control processor (CPU) and input/output resources such as a video interface unit, a bus interface unit, a system interface memory, and a variable length coder/decoder (or Huffman CODEC).

In addition to parallel quantization circuit 220, video processor 200 includes a register file and an arithmetic logic unit (ALU) 250. In the embodiment illustrated, register file 210 is a 32×64-bit memory having two 64-bit read ports and one 64-bit write port. Each 64-bit value from register file 64 can represent four 16-bit values for parallel processing. ALU 250 performs parallel arithmetic operations such as addition, subtraction, and multiplication of values from register file 210. A multiplexer 280 selects a result from an arithmetic operation of ALU 250, a result of a quantization operation of parallel quantization circuit 220, or a result from other circuits 270 for writing to a target register in register file 210 at the end of a cycle. The other circuits 270 perform functions of the processor that are not directly related to quantization and are not further described here.

For a quantization operation, a divisor latch or special register 230 in video processor 200 receives a divisor from a first source register in register file 210 or from a CPU (not shown) through a CPU bus multiplexer 215. In an exemplary embodiment, divisors may be limited to 6-bit values, but as described further below, parallel quantization circuit 220 does not need to implement all possible 6-bit values. When a divisor is first introduced into divisor register 230, a state machine 235 goes to a state corresponding to the first clock cycle of a quantization operation and determines from the divisor whether the quantization operation will require one, two, or three clock cycles.

A control table 240 outputs an 8-bit control signal corresponding to a table entry identified by the divisor value from divisor register 230 and a state signal from state machine 235. The 8-bit control signal includes control signals THREE, FIVE, SEVEN, ELEVEN, THIRTEEN, and QUANT[2:0], which are described above. The state signal indicates the current clock cycle of a quantization operation.

Quantization circuits 100-0 to 100-3 received the control signal from control table 240 nd a dividend from a second source register in register file 210. Each of quantization circuit 100-0 to 100-3 divides a corresponding 16-bit portion of the dividend by a divisor identified by the control signal from control table 240. The divisor that the control signal identifies is only the same as the divisor in special register 230 if quantization circuits can perform the division in one clock cycle.

Quantization circuits having the structure of FIG. 1 implement division by 1, 2, 3, 4, 5, 6, 7, 8, 10, 11, 12, 13, 14, 15, 16, 20, 21, 22, 24, 26, 28, 30, 32, 35, 40, 42,44,48, 52, 56, 60, and 63 in a single clock cycle. At the end of the clock cycle, multiplexer 280 selects the 64-bit output signal from parallel quantization circuit 220 for writing via latch 290 in a target register in register file 210, and state machine 235 then resets for the processor's next operation at the completion of the single cycle operation.

Quantization circuits having the structure of FIG. 1 implement division by 9, 18, 25, 33, 36, 39, 45, 49, 50, and 55 in two clock cycles. During the first clock cycle, state machine 235 indicates a first cycle, and the control signal from control table 240 selects division by 3, 3, 5, 3, 3, 3, 3, 7, 5, and 5 for divisors 9, 18, 25, 33, 36, 39, 45, 49, 50, and 55, respectively. Multiplexer 280 selects the 64-bit output signal from parallel quantization circuit 220 for writing via latch 290 in the target register in register file 210 at the end of the first clock cycle.

For the second clock cycle of the two-cycle operation, state machine 235 changes to indicate a second clock cycle of an operation, and register file 210 outputs a dividend from the target register instead of the source register. The control signal from control table 240 selects division by 3, 6, 5, 11, 12, 13, 15, 7, 10, and 11 for divisors 9, 18, 25, 33, 36, 39, 45, 49, 50, and 55, respectively. The result from parallel quantization circuit 220 at the end of the second clock cycle is written to the target register as the final result of the quantization operation, and state machine 240 resets for the next operation.

Quantization circuits having the structure of FIG. 1 implement division by 27 and 54 in three clock cycles. During the first clock cycle, state machine 235 indicates a first cycle, and the control signal from control table 240 selects division by 3. Multiplexer 280 selects the 64-bit output signal from parallel quantization circuit 220 for writing via latch 290 in the target register in register file 210 at the end of the first clock cycle. For the second clock cycle of the three-cycle operation, state machine 235 changes to indicate a second clock cycle of an operation, and register file 210 outputs a dividend from the target register instead of the source register. The control signal from control table 240 again selects division by 3, and the result is again written back to the target register at the end the second clock cycle. For the third clock cycle of the three-cycle operation, state machine 235 changes to indicate a third clock cycle of an operation, and register file 210 again outputs a dividend from the target register instead of the source register. The control signal from control table 240 selects division by 3 or 6 for divisor 27 or 54, and the final result is written to the target register at the end of the third clock cycle.

Video processor 200 implements a quantization operation having a divisor of 17, 19, 23, 29, or 31 using a second order approximation such as described above. During the first clock cycle, state machine 235 indicates a first cycle, and the control signal from control table 240 selects division by 16, 20,24, 30, or 32 for divisor 17, 19, 23, 29, or 31. Multiplexer 280 selects the 64-bit output signal from parallel quantization circuit 220 for writing via latch 290 in the target register in register file 210 at the end of the first clock cycle. For the second clock cycle, state machine 235 changes to indicate a second clock cycle of an operation, and register file 210 outputs a dividend from the target register. The control signal from control table 240 in the second clock cycle remains the same as in the first clock cycle, but the result of the second clock cycle is written to a different register to preserve the result from the first clock cycle. For the third clock cycle, parallel quantization circuit 220 does not perform a division, but ALU 250 combines the results of the two previous clock cycles to determine a final result, which is a second order approximation. The combination is the sum of the two results except when the divisor is 17 in which case the combination is the difference. The final result is written in the target register to complete the quantization operation.

The exemplary embodiment as described above implements quantization for all divisors between 1 and 32 but does not implement quantization for divisors 34, 37, 38, 41, 43, 46, 47, 53, 57, 58, 59, 61, and 62. These capabilities are well suited for current video standards such as MPEG4. In MPEG4, a receiver decoding a video signal performs quantization using a divisor that a sender selected, but the standard limits the range of allowable divisors to those less than 32. Accordingly, parallel quantization circuit 220 can perform all quantizations required for decoding MPEG4 video. When encoding a video signal, an encoding system can choose a divisor greater than 32 for a quantization process, but current video standards permit the encoding system to avoid any of the divisors that parallel quantization circuit 220 does not implement.

Although the invention has been described with reference to particular embodiments, the description is only an example of the invention's application and should not be taken as a limitation. For example, although the above exemplary embodiment employs only one divider for each prime number 3, 5, 7, 11, and 13 an alternative embodiment could employ two prime number dividers for a single prime number such as 3 (i.e., two divide-by-three circuits) or a divider for a non-prime number such as 9 (i.e., a divide-by-nine circuit) to enable particular divisions (e.g., by 9) in as single clock cycle. Additionally, one or more of the prime number dividers can be eliminated or dividers for other prime numbers could be added. Further, the input signal multiplexing circuitry for the dividers can be widely varied to change the possible combinations of prime number divisions that performable in a single clock cycle. Various other adaptations and combinations of features of the embodiments disclosed are within the scope of the invention as defined by the following claims.

I claim:

1. A quantization circuit comprising:
   a plurality of dividers including a first divider, a second divider, and a third divider, each divider corresponding to a prime number divisor and generating from an input signal representing a dividend an output signal representing the quotient of the dividend and the corresponding prime number divisor, wherein the first divider has an input port connected to receive a first signal representing a value to be quantized;
   a first multiplexing circuit connected to input ports of the second and third dividers, the multiplexing circuit operating to select an input signal for the second divider from a set of signals including the first signal and the output signal from the first divider, the first multiplexing circuit operating to select an input signal for the third divider from a set of signals including the first signal, and the output signal from the first divider, and an output signal from the second divider; and
   a second multiplexing circuit having input ports connected to the output ports of the first, second, and third dividers, the second multiplexing circuit operating to select a second signal for output from a set of signals including the output signals of the first, second, and third dividers.

2. The quantization circuit of claim 1, further comprising a shifter coupled to an output port of the second multiplexing circuit.

3. The quantization circuit of claim 2, wherein the prime number divisors corresponding to the first, second, and third divisors are three, five, and seven.

4. The quantization circuit of claim 3, wherein the plurality of dividers further comprises:
   a fourth divider and a fifth divider corresponding to a prime number divisor of eleven; and
   a fifth divider corresponding to a prime number divisor of thirteen.

5. The quantization circuit of claim 4, wherein:
   the first multiplexing circuit is connected to input ports of the fourth and fifth dividers;
   the first multiplexing circuit operates to select an input signal for the fourth divider from a set of signals including the first signal and the output signals from the first, second, and third dividers; and
   the first multiplexing circuit operates to select an input signal for the fifth divider from a set of signals including the first signal and the output signals from the first, second, third, and fourth dividers.

6. The quantization circuit of claim 1, wherein each of the dividers comprises a look-up table of quotients resulting from division of input values by the prime number divisor corresponding to that divider.

7. The quantization circuit of claim 1, further comprising an arithmetic logic unit connected to combine results from two or more operations of the dividers.

8. The quantization circuit of claim 1, further comprising a register file having a read port coupled to an input port of the first multiplexing circuit and a write port coupled to an output port of the second multiplexing circuit.

9. The quantization circuit of claim 8, further comprising a shift circuit coupled between the output port of the second multiplexing circuit and the write port of the register file.

10. The quantization circuit of claim 9, further comprising an arithmetic logic unit connected to combine results from two or more operations of the dividers.

11. A method for operating the quantization circuit of claim 1 to divide a dividend by a divisor, comprising controlling the first multiplexing circuit so that except for a last divider in a series, each divider in the series provides the signal input to a following divider in the series, wherein a ratio of the divisor and a product of the prime number divisors corresponding to the dividers in the series is an integer.

12. The method of claim 11, wherein the integer is one.

13. The method of claim 11, further comprising:
   feeding back an output signal of the quantization circuit as an input signal to the quantization circuit; and
   controlling the first multiplexing circuit so that except for a last divider in a further series, each divider in the further series provides input to a following divider in the series, wherein a ratio of the divisor and a product of the prime number divisors corresponding to the dividers in the series is an integer.

14. The method of claim 13, further comprising combining a first result represented by the output signal fed back to the quantization circuit and a second result that the quantization circuit provides when the first multiplexing circuit is controlled for the further series.

15. The method of claim 14, further comprising repeating the feeding back and controlling steps of claim 14 one or more times.

16. The method of claim 15, further comprising combining a first result represented by the output signal fed back to the quantization circuit and further results that the quantization circuit provides when the first multiplexing circuit is controlled for the further series.

17. A quantization circuit comprising:
   a plurality of dividers, each divider corresponding to a prime number divisor and generating from an input signal representing a dividend an output signal representing the quotient of the dividend and the corresponding prime number divisor;

a first multiplexing circuit connected to select the input signals for the dividers;

a second multiplexing circuit connected to receive the output signals of the dividers and operating to select a result signal from a set of signals including the output signals of the dividers; and a storage circuit connected to the first and second multiplexing circuits, the storage circuit receiving the result signal from the second multiplexing circuit during a first clock cycle and providing a signal having the same value as the result signal to the first multiplexing circuit for processing during a second clock cycle.

18. The quantization circuit of claim 17, wherein the storage circuit comprises a register file.

19. The quantization circuit of claim 17, further comprising a shifter coupled between the second multiplexing circuit and the storage circuit.

20. The quantization circuit of claim 17, further comprising an arithmetic logic unit coupled to the storage circuit, the arithmetic logic unit being operable to combine results based on operations of the dividers during the first and second clock cycle.

* * * * *